H. M. SPRECHER.
MILK COOLING APPARATUS.
APPLICATION FILED JUNE 14, 1919. RENEWED NOV. 23, 1921.
1,426,515. Patented Aug. 22, 1922.
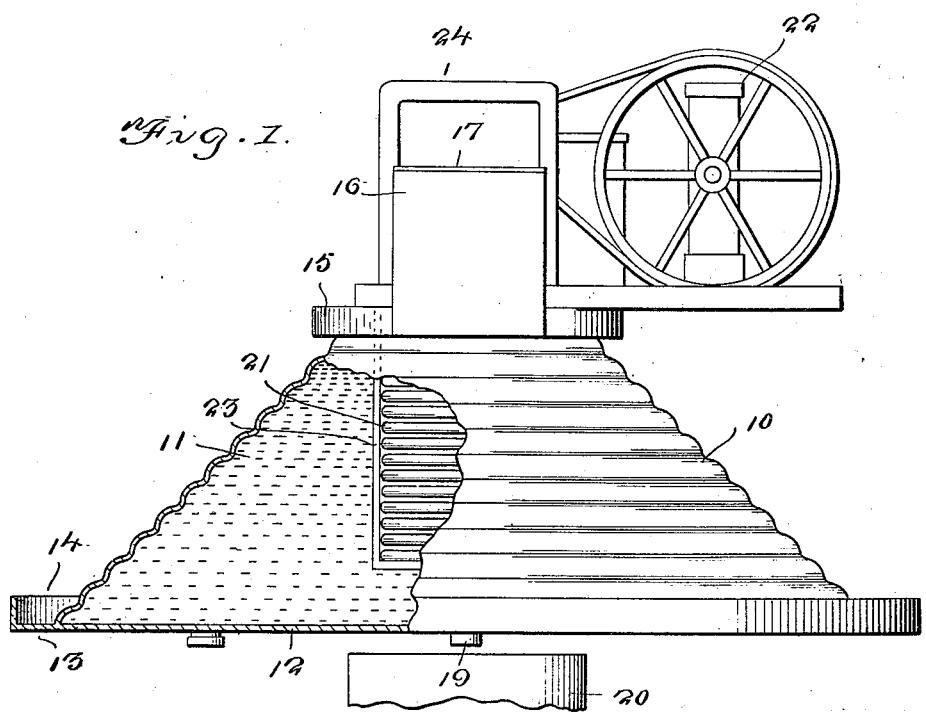
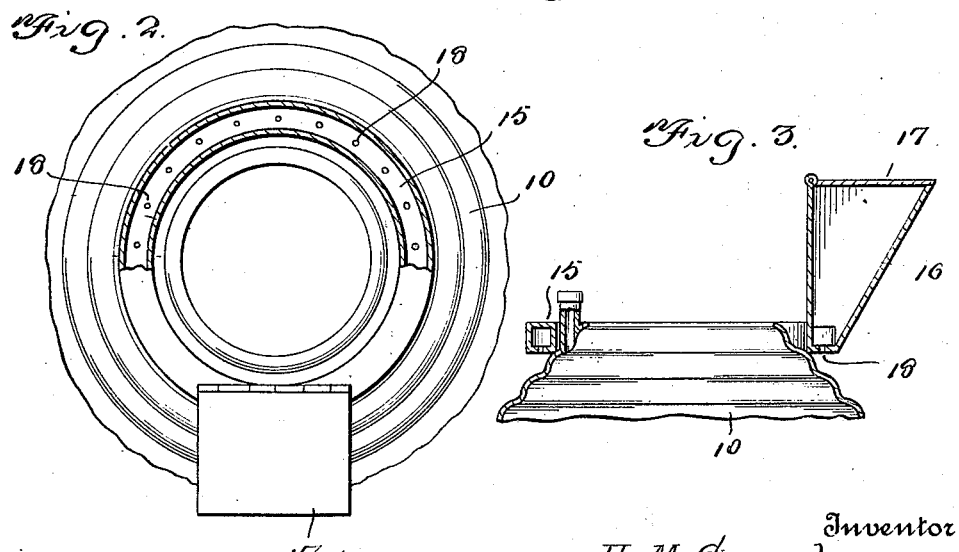
Inventor
H. M. Sprecher
By Victor J. Evans
Attorney
Witnesses
E. R. Ruppert

UNITED STATES PATENT OFFICE.

HARRY M. SPRECHER, OF EPHRATA, PENNSYLVANIA.

MILK-COOLING APPARATUS.

1,426,515.  Specification of Letters Patent.  Patented Aug. 22, 1922.

Application filed June 14, 1919, Serial No. 304,214. Renewed November 23, 1921. Serial No. 517,379.

*To all whom it may concern:*

Be it known that I, HARRY M. SPRECHER, a citizen of the United States, residing at Ephrata, in the county of Lancaster and State of Pennsylvania, have invented new and useful Improvements in Milk-Cooling Apparatus, of which the following is a specification.

This invention relates to milk cooling apparatuses.

In all devices of this character with which I am familiar, the milk is permitted to flow over the outside of a receptacle, through which the cooling agent passes, thus limiting the use of the apparatus to places where it can be coupled with a source or supply of cooling medium.

The present invention contemplates a construction and operation of an apparatus of the above mentioned character whereby the same can be used at any time or place, as the cooling medium is contained within the vessel over which the milk trickles, and is maintained at a lower temperature.

To this end, use is made of a well known type of refrigerating machine, the latter being partly submerged in a fluid containing vessel, over which the milk to be cooled trickles. The fluid cooled walls of the vessel absorb the heat from the milk, while the cooling agent circulating through the machine absorbs the heat from the fluid, thus maintaining the latter at a low temperature.

In carrying out my invention, I roughen or corrugate the surface of the vessel to retard the flow thereover of the milk to be cooled, so that the latter will be relieved of all the heat before being conveyed from the vessel to its destination.

Another object of importance resides in the novel manner of distributing the milk over the cooling surface of the vessel.

Other objects and advantages will appear from the following detail description when taken in connection with the accompanying drawing, the invention residing in the construction, combination and arrangement of parts as claimed.

In the drawing forming part of the specification, like numerals of reference indicate similar parts in the several views and wherein.

Figure 1 is a view in elevation and partly in section.

Figure 2 is a plan view partly in section, certain parts being removed to more clearly illustrate the invention.

Figure 3 is a fragmentary section of the other parts of the fluid containing vessel.

In carrying out my invention, use is made of a vessel indicated at 10 and adapted to contain a fluid 11 for cooling the walls of the vessel. While the vessel may vary in size and configuration, I preferably give the vessel a substantially cone shaped design, extending the bottom 12 beyond the lower edge of the vessel to define a trough 13 including a vertical wall 14.

Surrounding the upper end of the vessel 10 is a hollow annulus 15 which communicates with the reservoir 16. This reservoir is supported by the annulus 15, and preferably though not necessarily is formed integrally therewith. The reservoir 16 is provided with a cover 17 for controlling access to the interior of the reservoir. The bottom or lower wall of the hollow annulus 15 is provided with a circumferential series of small openings or apertures 18 through which the milk passes onto the surface of the vessel 10. Obviously the milk passes from the reservoir 16 to the hollow annulus 15, the latter distributing the milk over the entire surface of the vessel 10. Through the walls 10 of the fluid containing vessel, the refrigerant 11 absorbs the heat from the milk thereby cooling the latter. Manifestly the milk passes from the surface of the vessel 10 into the trough 13, from where it is conveyed by the pipe 19 into a storage tank or other suitable receptacle indicated at 20. The surface of the vessel 10 is shown as corrugated to retard the flow of milk, and increase the area over which the milk trickles before entering the trough 13, thus relieving the milk of all heat before it is conveyed to its destination, or from the trough 13 to the receptacle 20. It is to be understood, that the surface of the vessel 10 may be otherwise suitably roughened, instead of being corrugated, for the purpose mentioned.

In conjunction with the structure just described, I make use of a refrigerating machine of a well known type for maintaining the fluid 11 at a low temperature. Any suitable means may be employed for this purpose. The machine illustrated, embodies a coil 21 through which a cooling agent is forced or circulated by means of a pump driven by the motor 22. The coil 21 is housed within a casing 23 which is submersed in the fluid 11 as shown in Figure 1. The coil 21 communicates with a radiator 24 through which the cooling agent passes from the coil, to be relieved of the heat which it has absorbed, and consequently cooled before being again forced or circulated through the coil 21. In practice, the milk is distributed over the roughened surface of the vessel 10 and as it trickles thereover, in the direction of the trough 13, the fluid 11 which is maintained at a very low temperature by means of the coil 21, absorbs the heat from the milk so that it is conveyed from the trough 13 to the receptacle or storage tank 20 in a cool condition. The coils 21 absorb the heat from the fluid 11 and the cooling agent circulating within the coils carries said heat to the atmosphere through the radiator 24 as above described.

While I have shown and described what I consider the preferred embodiment of the invention I desire to have it understood that what is shown is merely illustrative, and that I do not limit myself to this exact arrangement, in that such changes may be resorted to when desired as fall within the scope of what is claimed.

Having thus described my invention what I claim is;

1. A milk cooling apparatus comprising a fluid containing vessel, cooling means submerged in the fluid for maintaining the fluid at a low temperature, a hollow annulus surrounding said vessel adjacent one end, a milk reservoir communicating with said annulus, and the latter having openings for distributing the milk over the surface of said vessel to be cooled.

2. A milk cooling apparatus comprising a fluid containing vessel, cooling means submerged in the fluid for maintaining the fluid at a low temperature, a hollow annulus surrounding said vessel adjacent one end, a milk reservoir supported by said annulus and communicating with the latter, and said annulus having openings for distributing the milk over the surface of said vessel to be cooled.

In testimony whereof I affix my signature.

HARRY M. SPRECHER.